(12) United States Patent
Graser et al.

(10) Patent No.: US 6,944,845 B2
(45) Date of Patent: *Sep. 13, 2005

(54) IMPLEMENTATION FOR AN OBJECT ORIENTED RUN-TIME EXTENSIBLE ITEM

(75) Inventors: Timothy James Graser, Rochester, MN (US); Steven Lester Halter, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 890 days.

This patent is subject to a terminal disclaimer.

(21) Appl. No.: 09/799,956

(22) Filed: Mar. 6, 2001

(65) Prior Publication Data

US 2001/0011368 A1 Aug. 2, 2001

Related U.S. Application Data

(60) Division of application No. 09/291,543, filed on Apr. 14, 1999, now Pat. No. 6,275,979, which is a continuation-in-part of application No. 09/038,024, filed on Mar. 11, 1998, now Pat. No. 6,106,569.

(51) Int. Cl.$^7$ ................................................. G06F 9/44
(52) U.S. Cl. ........................ 717/116; 717/108; 717/121
(58) Field of Search ................................. 717/108, 116, 717/120, 121

(56) References Cited

U.S. PATENT DOCUMENTS

| | | | | |
|---|---|---|---|---|
| 5,761,509 A | * | 6/1998 | Danforth et al. ............. | 717/116 |
| 5,867,709 A | * | 2/1999 | Klencke ...................... | 717/111 |
| 5,878,432 A | * | 3/1999 | Misheski et al. ........ | 707/103 R |
| 5,905,987 A | * | 5/1999 | Shutt et al. .............. | 707/103 R |
| 5,987,247 A | * | 11/1999 | Lau ............................ | 717/100 |
| 6,049,665 A | * | 4/2000 | Branson et al. ............. | 717/108 |
| 6,104,874 A | * | 8/2000 | Branson et al. ............. | 717/108 |
| 6,106,569 A | * | 8/2000 | Bohrer et al. ............... | 717/100 |
| 6,173,439 B1 | * | 1/2001 | Carlson et al. ............. | 717/108 |
| 6,275,979 B1 | * | 8/2001 | Graser et al. ............... | 717/100 |
| 6,351,843 B1 | * | 2/2002 | Berkley et al. ............. | 717/128 |
| 6,405,363 B1 | * | 6/2002 | Carlson et al. ............. | 717/100 |
| 6,434,739 B1 | * | 8/2002 | Branson et al. ............. | 717/108 |
| 6,513,152 B1 | * | 1/2003 | Branson et al. ............. | 717/100 |

* cited by examiner

Primary Examiner—Tuan Dam
Assistant Examiner—Michael Yigdall
(74) Attorney, Agent, or Firm—Martin & Associates, LLC; Derek P. Martin

(57) ABSTRACT

In an object-oriented computer system, one or more run-time extensible items may be dynamically reconfigured as required to support different interfaces at run-time via one or more extensions owned by the extensible item. When an invokeMethod( ) method on an extensible item is invoked, specifying the method name, the extensible item cycles through its extensions, from newest to oldest, looking for an extension that supports the named method. Each extension determines whether a method table exists that corresponds to the extension class. If not, a method table corresponding to the extension class is created. When an extension is found that supports the named method, a method node that corresponds to the named method is returned. The method node then invokes the named method on the extension.

22 Claims, 9 Drawing Sheets

IMPLEMENTATION FOR AN OBJECT ORIENTED RUN-TIME EXTENSIBLE ITEM

REFERENCE TO PARENT APPLICATIONS

This application is a Divisional of "Implementation for an Object Oriented Run-Time Extensible Item", U.S. Ser. No. 09/291,543, filed on Apr. 14, 1999, now U.S. Pat. No. 6,275,979 issued on Aug. 14, 2001, which is a Continuation-In-Part of "A Method of Developing a Software System Using Object Oriented Technology", U.S. Ser. No. 09/038,024, filed Mar. 11, 1998, now U.S. Pat. No. 6,106,569 issued on Aug. 22, 2000, which are both incorporated herein by reference.

BACKGROUND OF THE INVENTION

1. Technical Field

This invention generally relates to object oriented programming and more specifically relates to an implementation for a run-time extensible item.

2. Background Art

Since the dawn of the computer age, computer systems have evolved into extremely sophisticated devices, and computer systems may now be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object oriented programming concepts. The goal of using object oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

A central concept in object oriented programming is the "class." A class is a template that defines a type of object. A class outlines or describes the characteristics or makeup of objects that belong to that class. By defining a class, objects can be created that belong to the class without having to rewrite the entire definition for each new object. This feature of object oriented programming promotes the reusability of existing object definitions and promotes more efficient use of program code.

Frameworks are relatively recent developments in object oriented programming that provide a group of pre-packaged classes and class relationships that are designed to help a user easily extend the framework to develop a particular software program, such as a software application. One framework that is commercially available from IBM is known as San Francisco, which provides pre-defined classes that allow a user to easily extend the framework to define a custom software application, such as a general ledger or an order processing system. Version 1.2 of the San Francisco framework defines a special type of domain-neutral object mechanism referred to herein as an extensible item. An extensible item can be dynamically reconfigured at run-time by adding or deleting domain-specific extensions to the extensible item object. An extensible item that holds a particular primary extension logically becomes an object of the type defined by the primary extension, thereby becoming domain-specific. In this manner the extensible item, which is domain-neutral, can acquire domain-specific extensions that define behavior that allows the extensible item to function as though it were domain-specific itself.

Each extensible item in the San Francisco framework contains a method table that pairs method names with corresponding method nodes. When a method on an extensible item is invoked, the extensible item determines which method node in the method table corresponds to the invoked method, and calls an execute( ) method on the corresponding method node. The method node, in turn, invokes the actual method on the appropriate instance, be it an extension to the extensible item or the extensible item itself.

Because the extensible item contains the method table, which in turn contains all method nodes that correspond to the extensible item and all of its extensions, the memory requirements (referred to as the "footprint") for an extensible item may be quite large. In addition, creating or deleting an extension to an extensible item is a time-consuming process. If extensible items were rarely added, this performance problem would be unimportant. However, the very purpose of providing extensible items is to allow dynamically adding and deleting extensions to the extensible items, so extensions are frequently added and deleted from extensible items. Without a way to reduce the memory footprint for extensible items and for reducing the run-time penalty of adding extensions to extensible items, the performance of an application that is developed using the San Francisco framework will be impaired.

DISCLOSURE OF INVENTION

In an object oriented computer system, one or more run-time extensible items are defined that may be dynamically reconfigured as required to support different interfaces at run-time. The behavior associated with these interfaces is supported by one or more extensions owned by the extensible item. Each extension class has a corresponding method table that is shared among instances of the extension class and that correlates the methods defined on the extension class to method node objects that carry out the method. A method repository is a static object that is created at run-time to correlate extensions to their corresponding method tables. When a client invokes an invokeMethod( ) method on an extensible item, specifying the name of the method to be invoked, the extensible item cycles through its extensions, from newest to oldest, looking for an extension that supports the named method. Each extension examines the method repository to see if the method repository contains a method table corresponding to the extension class. If not, a method table corresponding to the extension class is created and placed in the method repository. When an extension is found that supports the named method, a method node that corresponds to the named method is returned. The method node then invokes the named method on the extension.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 1:
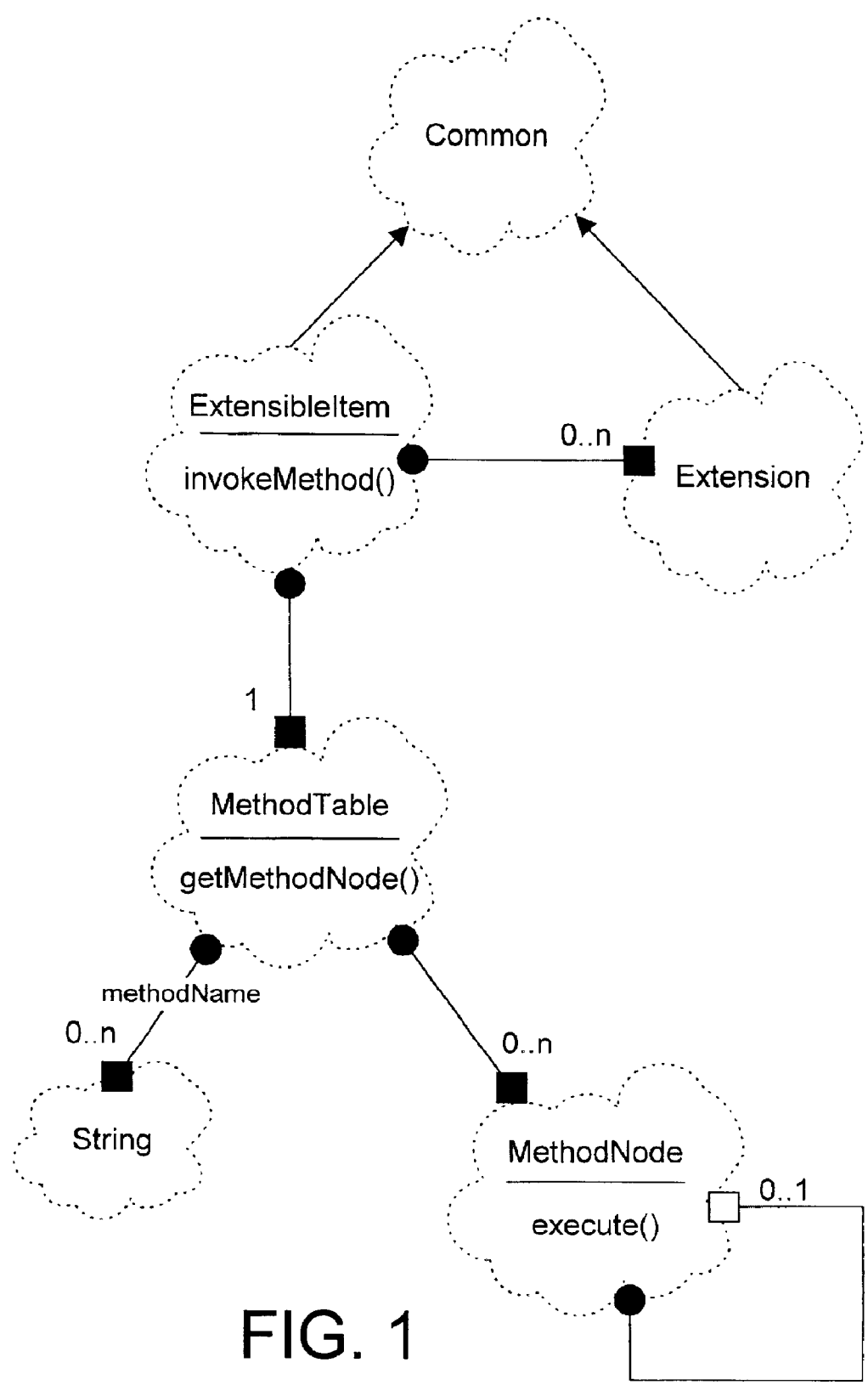
FIG. 1 is a class diagram of a prior art implementation of a run-time extensible item.

The present invention is accomplished through the use of object oriented programming concepts. For those who are not familiar with object oriented programming concepts, the brief overview below provides background information that will help the reader to understand the present invention.
1. Overview

Object Oriented Technology v. Procedural Technology

Object oriented programming is a method of program implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process used to solve the problem; whereas the focus of object oriented design is on casting the problem as a set of autonomous entities that can work together to provide a solution. The autonomous entities of object oriented technology are, of course, objects. Object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code and data that provides one or more services when requested by a client. The term "client" is used herein to refer to any type of computer program, whether object oriented or not, that can invoke a method on an object oriented object. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what operations to perform.

There are many computer languages that presently support object oriented programming techniques. For example, Smalltalk, Object Pascal, C++ and Java are all examples of programming languages that support object oriented programming to one degree or another.

The Term Framework

There has been an evolution of terms and phrases which have particular meaning to those skilled in the art of OO design. However, the reader should note that one of loosest definitions in the OO art is the definition of the word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an OO mechanism that has been designed to have core function and extensible function. The core function is that part of the framework mechanism that is not subject to modification by the framework purchaser. The extensible function, on the other hand, is that part of the framework mechanism that has been explicitly designed to be customized and extended by the framework purchaser.

OO Framework Mechanisms

While in general terms an OO framework mechanism can be properly characterized as an OO solution, there is nevertheless a fundamental difference between a framework mechanism and a basic OO solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to purchasers (referred to herein as framework consumers) because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

IBM's San Francisco Framework

IBM introduced a framework product known as "San Francisco" that provides a framework for programming business applications, such as a general ledger or order processing application. San Francisco provides a set of base services such as persistence and transaction support as well as a set of common business objects such as currency and business partner. Above the base layer, San Francisco provides frameworks that define the basis of an application such as a general ledger or order management with well-defined extension points. A user may take advantage of the power and flexibility of San Francisco by providing user-defined extensions that customize San Francisco for a particular application. San Francisco thus provides a "short cut" to custom programming an entire application by providing pre-packaged code that is easily extended by a user to provide a custom application.

Extensible Items within IBM's San Francisco Framework

An important concept embodied in the San Francisco framework is the ability to separate mechanisms in the framework from domain-specific behavior. This is accomplished using dynamic run-time extensions that may be added to or deleted from an object to dynamically change the object's behavior. The extensions are objects that define interfaces that the extended object supports. Thus, the addition of an extension causes an object to support additional methods defined by those extensions, and the deletion of an extension causes an object to lose the support for the methods defined by the extension. An object may have a primary extension, and one or more additional extensions. An object with a primary extension logically becomes an object of the type defined by the primary extension. Thus, if an object has a primary extension OrderDetail, the object logically appears to be a member of the OrderDetail class. This ability to dynamically modify the behavior of objects at run-time is one of the powerful concepts supported in the San Francisco framework.

The class diagram of FIG. 1 illustrates a simplified implementation of an ExtensibleItem with dynamic run-time extensions that is representative of many of the salient features of ExtensibleItems within the San Francisco framework. An ExtensibleItem class represents a pure mechanism that is domain-neutral, i.e., that has no information (or need of information) that pertains to the specific domain in which an instance of ExtensibleItem is used. The ExtensibleItem class has a "has" relationship with an Extension class, which defines domain-specific run-time extensions that add functionality to an ExtensibleItem object that is required by the particular domain. This "has" relationship represents that each ExtensibleItem object may "own" one or more Extension objects. The ExtensibleItem class defines an invokeMethod( ) method (of function) that is invoked by a client when a particular method on the ExtensibleItem needs to be executed. Both the ExtensibleItem class and the Extension class are subclasses of a Common class.

The ExtensibleItem class also has a "has" relationship with a MethodTable class. MethodTable is a table of key-value pairs. The key for each pair is the name of the method (methodName), and the value for each pair is the Method-Node that corresponds to the methodName. MethodTable thus defines a table of methods that allows locating a MethodNode that corresponds to a particular methodName by invoking the getMethodNode( ) method, passing the methodName as a parameter. The MethodNode class defines a method executes that is invoked to cause the method corresponding to the MethodNode to be invoked on a particular instance of the Common class. Note that the MethodNode class includes references to other MethodNodes which allow linking method nodes together. This concept of linking method nodes is discussed below with reference to FIG. 5. In addition to listing all methods for a particular Extension object or ExtensibleItem object, the MethodTable also includes a list of methods that have been hidden. Thus, even if a method has been defined, if it has been dynamically hidden, the MethodTable will not return the method.

Figure 2:
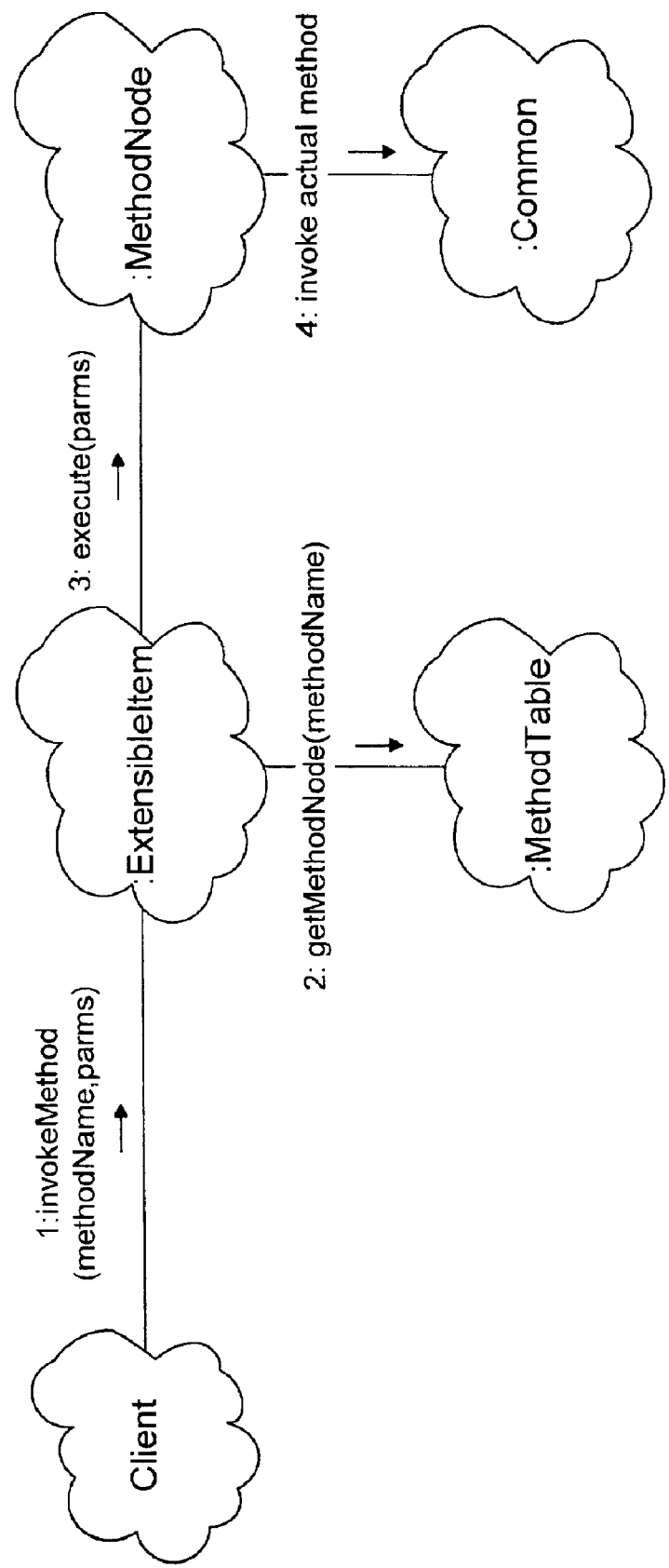
FIG. 2 is an object interaction diagram showing the interaction between instances of the classes shown in FIG. 1 in accordance with the prior art when the invokeMethod( ) method on the ExtensibleItem is invoked by a client.

Referring now to FIG. 2, an object interaction diagram shows the steps in invoking a method for the system represented by the class diagram of FIG. 1. First, a client invokes the invokeMethod( ) method on an instance of the ExtensibleItem class, passing the name of the method it wants to invoke as methodName, and passing other parameters as required (step 1). The ExtensibleItem object then invokes a getMethodNode( ) method on its MethodTable instance, passing the methodName as a parameter (step 2). The MethodTable object looks up the methodName, and returns the MethodNode that corresponds to the methodName to the ExtensibleItem. The ExtensibleItem then invokes the executes method on the MethodNode returned in step 2 (step 3), passing the required parameters. In response, the MethodNode object invokes the actual method on the appropriate instance of the Common class (step 4).

Figure 3:
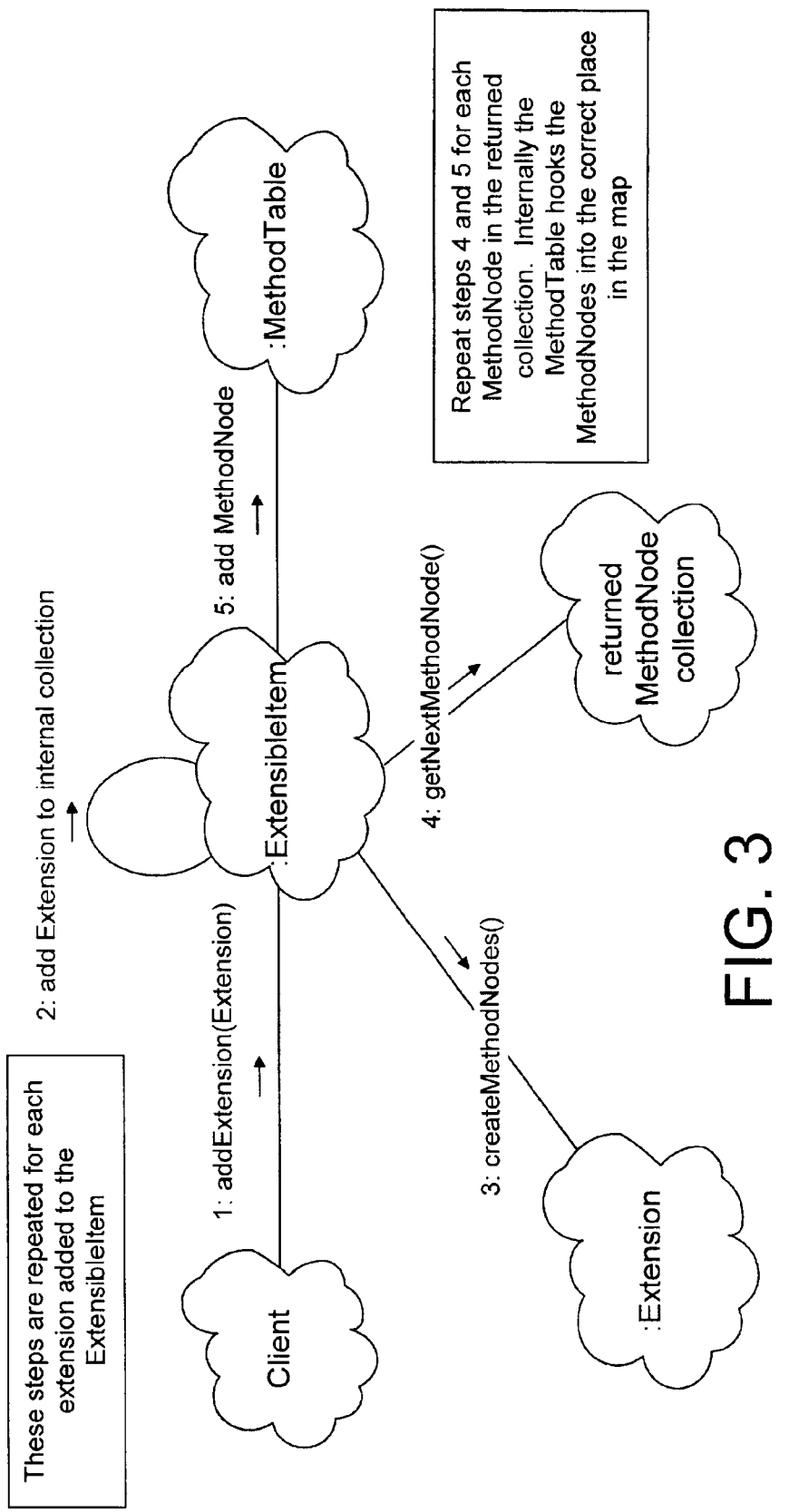
FIG. 3 is an object interaction diagram showing the steps in adding an extension to an extensible item in accordance with the prior art.

The steps for adding an extension to an extensible item in the San Francisco framework are shown in FIG. 3. First, a client invokes an addExtension( ) method on an ExtensibleItem object, passing the Extension to add as a parameter (step 1). The ExtensibleItem then adds the new Extension to its internal collection of extensions (step 2). At this point, method nodes that correspond to the methods defined on the Extension need to be created. The ExtensibleItem object invokes the createMethodNodes( ) method on the Extension object (step 3), which creates method nodes for each method defined on the Extension class. In response to invoking the createMethodNodes( ) method in step 3, the Extension returns a collection of method nodes that correspond to methods defined on the Extension. Once the ExtensibleItem has the collection of method nodes, it must process these method nodes to add these nodes to the method table. The getNextMethodNode( ) method is invoked on the MethodNodeCollection that was returned in step 3, which returns the first method node in the collection to the ExtensibleItem. This MethodNode is then added to the MethodTable (step 5). At this point steps 4 and 5 are repeated for each MethodNode in the collection that was returned in step 3. In response, the MethodTable adds each MethodNode to its table in the correct place, as described below with reference to FIGS. 4 and 5.

Figure 4:
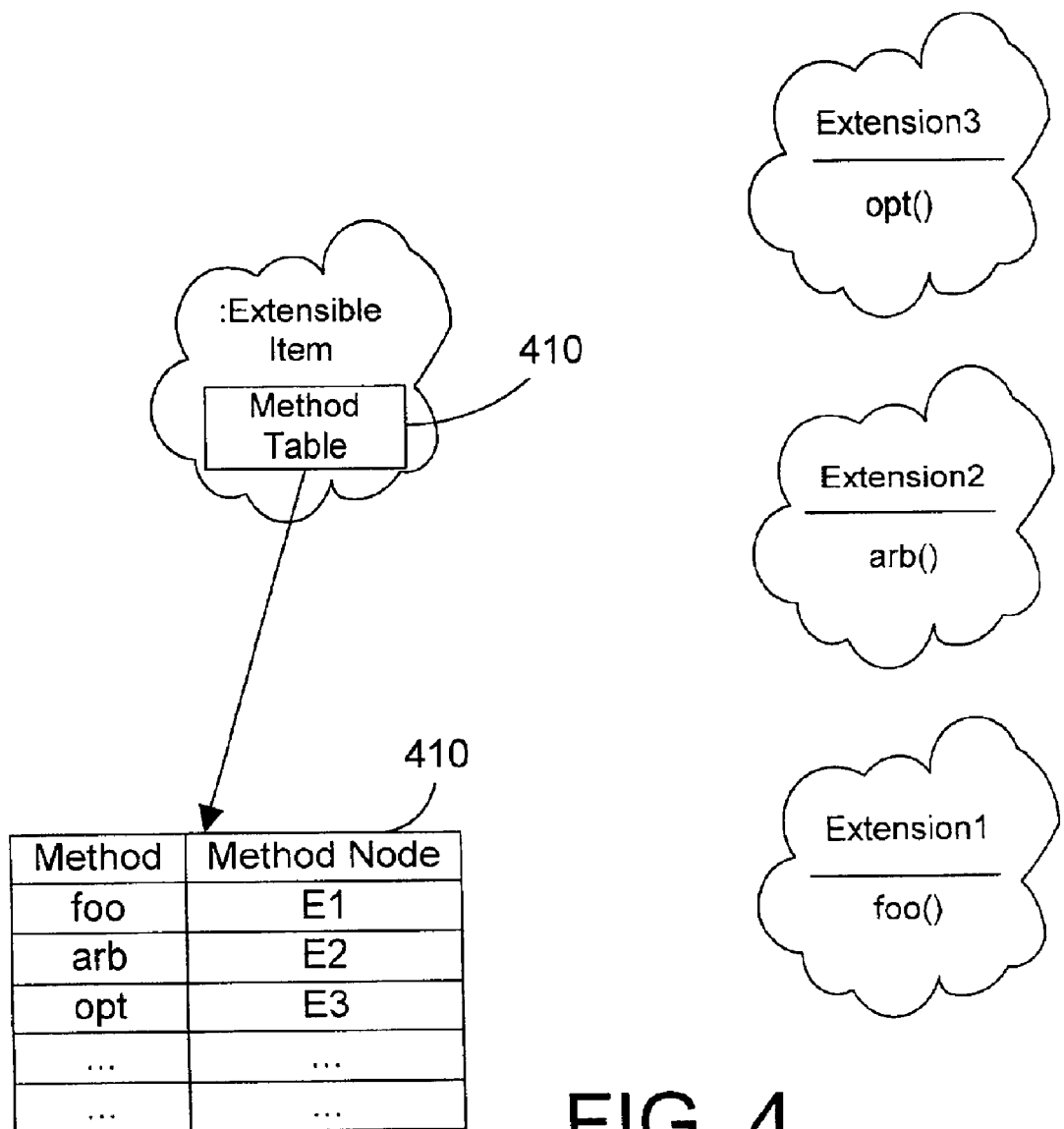
FIG. 4 is an object diagram illustrating the implementation of a method table for a prior art extensible item.

A specific example of an ExtensibleItem object is shown in FIG. 4. This ExtensibleItem has three defined extensions, Extension1 that defines a foo( ) method, Extension2 that defines an arb( ) method, and Extension3 that defines an opt( ) method. ExtensibleItem contains a MethodTable 410, which is shown to include key-value pairs that correlate a method name to a corresponding MethodNode. In the preferred embodiment, MethodTable 410 is itself an object, but could be a table implemented within the ExtensibleItem object itself. According to the MethodTable 410, the foo methodName corresponds to the E1 MethodNode, the arb methodName corresponds to the E2 MethodNode, and the opt methodName corresponds to the E3 MethodNode. Next we examine how the MethodTable 410 changes as extensions are added to the ExtensibleItem.

Figure 5:
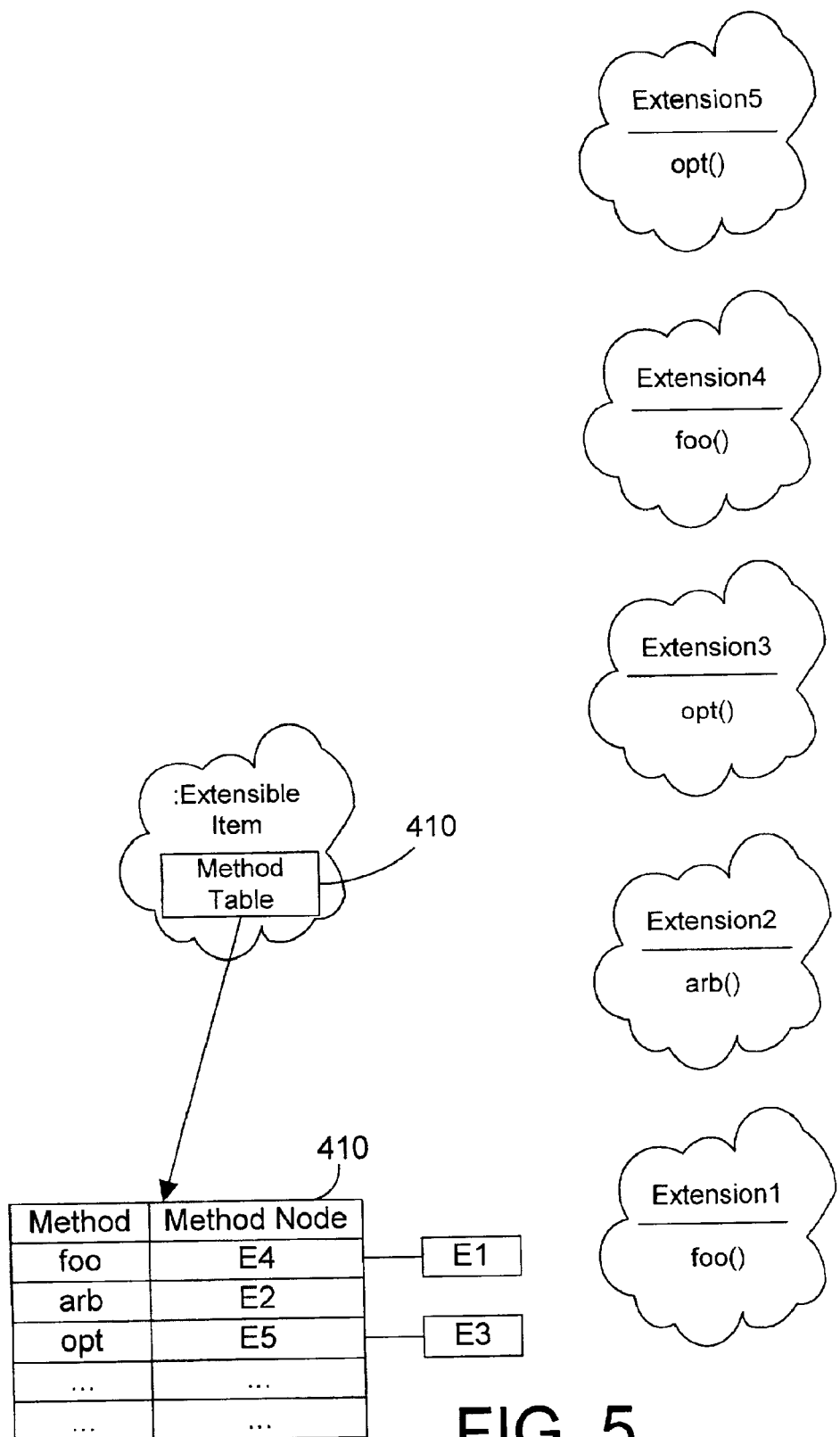
FIG. 5 is an object diagram illustrating the addition of extensions to a prior art extensible item.

Referring to FIG. 5, two new extensions Extension4 and Extension5 have been added to the ExtensibleItem object. Extension4 defines a new implementation for the foo( ) method, and Extension5 defines a new implementation for the opt( ) method. Referring back to FIG. 3, these extensions are preferably added using steps 1–5 as shown. First, the addExtension( ) method is invoked on the ExtensibleItem, specifying Extension4 as the extension to add (step 1). Extension4 is then added to the internal collection of the ExtensibleItem (step 2), and createMethodNodes( ) is invoked on Extension4 (step 3). In response, Extension4 returns a collection of all method nodes that are defined by in Extension4, which for this particular example includes a single method node E4 that corresponds to the foo( ) method. The getNextMethodNode( ) is invoked on the method node collection, which returns the method node E4 corresponding to the foo( ) method (step 4). Finally, E4 is added to the MethodTable in step 5. FIG. 5 illustrates how E4 is added to the MethodTable 410. In the San Francisco framework, each new extension that defines methods that have already been defined by other extensions effectively override the methods in the previous extensions, but the definitions in the earlier extensions are still preserved so they can be used if the extensions that override them are deleted later on. Thus, the MethodTable 410 of FIG. 5 shows that adding the Extension4 object as an extension to the ExtensibleItem results in updating the MethodNode corresponding to the foo method name with MethodNode E4, which corresponds to the foo( ) definition in Extension4. Note that the previous MethodNode E1 is retained, and is linked to MethodNode E4 so that method node E1 can be restored into the MethodTable 410 should Extension4 be deleted. The steps in FIG. 3 are then repeated for Extension5, which results in updating MethodTable 410 so that MethodNode E5 corresponds to the opt( ) method. Note again that the implementation of opt( ) in Extension3 is preserved by providing a pointer from E5 to E3.

The information in the MethodTable may be maintained either as extensions are added to or removed from the ExtensibleItem, or may be built as the extensions are used. In the latter case, as a method call is delegated to an extension for the first time, its methods are added to the MethodTable. This solution is dynamic by maintaining cached information as the extensions are added and removed from the ExtensibleItem. Extensible items thus provide a powerful and dynamic way to change the interface for an object at run-time so the object can acquire and tailor its domain-specific behavior as required.

2. Detailed Description

The known run-time extensible items defined by IBM's San Francisco framework version 1.2 provide a powerful way for dynamically modifying the function of an object at run-time. However, the specific implementation of the ExtensibleItem in San Francisco can create a large footprint in memory for the ExtensibleItem. Furthermore, there is significant overhead in adding and deleting extensions to an extensible item, as shown by the steps in FIG. 3. Because the addition and deletion of extensions to extensible items is a very common occurrence in the San Francisco framework, this overhead can significantly impact system performance. The present invention was developed to provide an implementation for an ExtensibleItem that is transparent to any client that uses extensible items, but that greatly improves the performance of computer programs that use ExtensibleItems when compared to the implementation in version 1.2 of the San Francisco framework.

Figure 6:
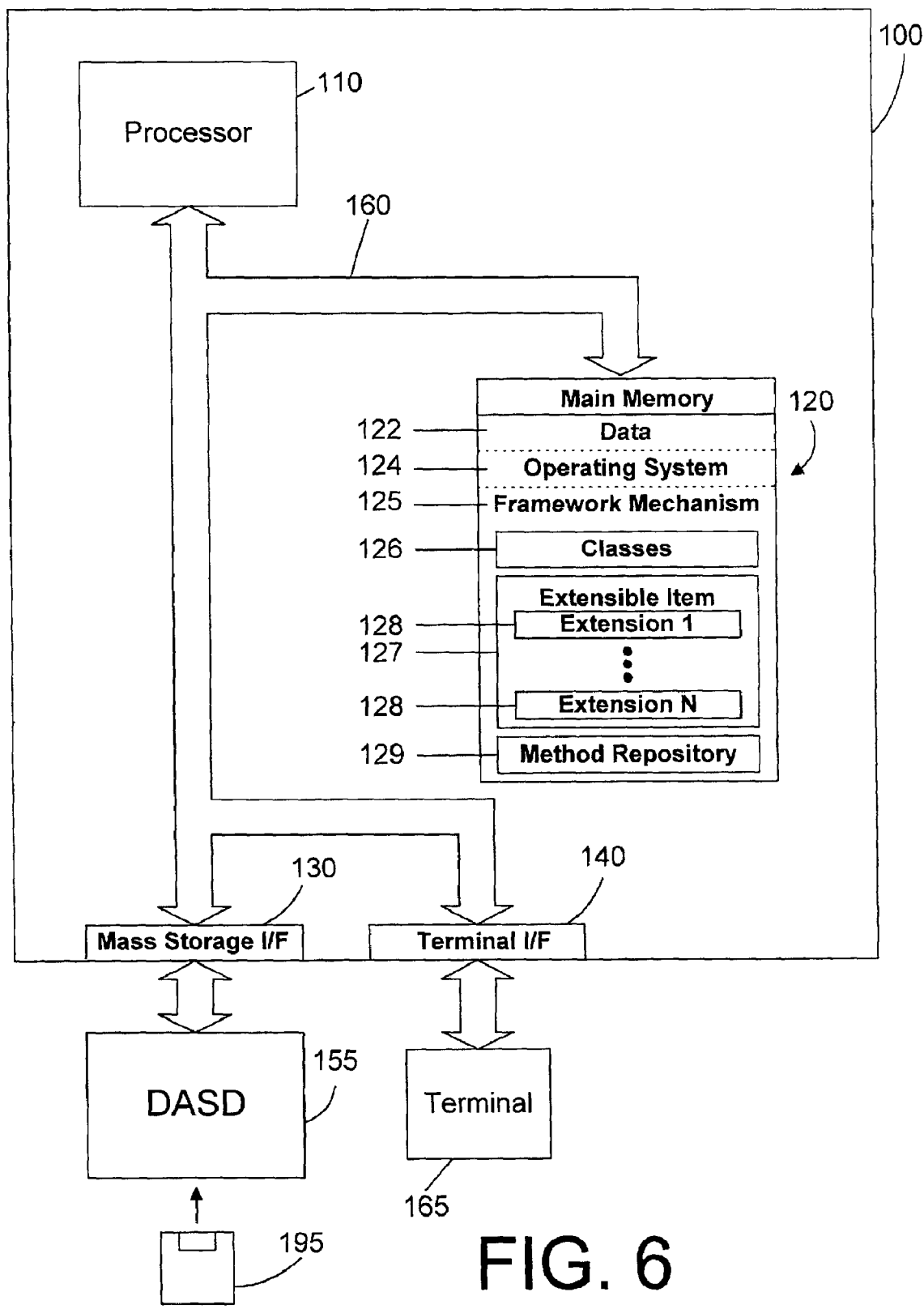
FIG. 6 is a block diagram of an apparatus in accordance with the preferred embodiments.

Referring to FIG. 6, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, and a terminal interface 140. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 122, an operating system 124, and an object oriented framework mechanism 125 in accordance with the preferred embodiments. Framework 125 includes multiple pre-defined classes 126, one or more extensible items 127, and a method repository 129. Each ExtensibleItem 127 may include zero to N extensions 128 that dynamically change the function of the ExtensibleItem 128 at run-time. While extensible item 127 and method repository 129 are shown in the preferred embodiment to reside within an object oriented framework 125, the present invention expressly encompasses any implementation of an extensible item in any computer program.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 124, and framework mechanism 125 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 122 represents any data that serves as input to or output from any program in computer system 100. Operating system 124 is a multitasking operating system known in the industry as OS/400; however, those skilled in the art will appreciate that the spirit and scope of the present invention is not limited to any one operating system. Operating system 124 preferably supports an object oriented programming environment such as that provided, for example, by the Java programming language.

Framework mechanism 125 is preferably an object oriented framework that defines Extensible Items 127 that can be dynamically changed at run-time by adding or deleting extensions 128. Extensible item 127 has a different implementation than the extensible items in the San Francisco framework. In particular, the extensible item 127 does not contain a method table, but instead references a method repository 129 to determine which method to invoke when a method is invoked on the extensible item 127. These differences are described in more detail below with reference to FIGS. 7–9.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, and system bus 160.

Although computer system 100 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 7:
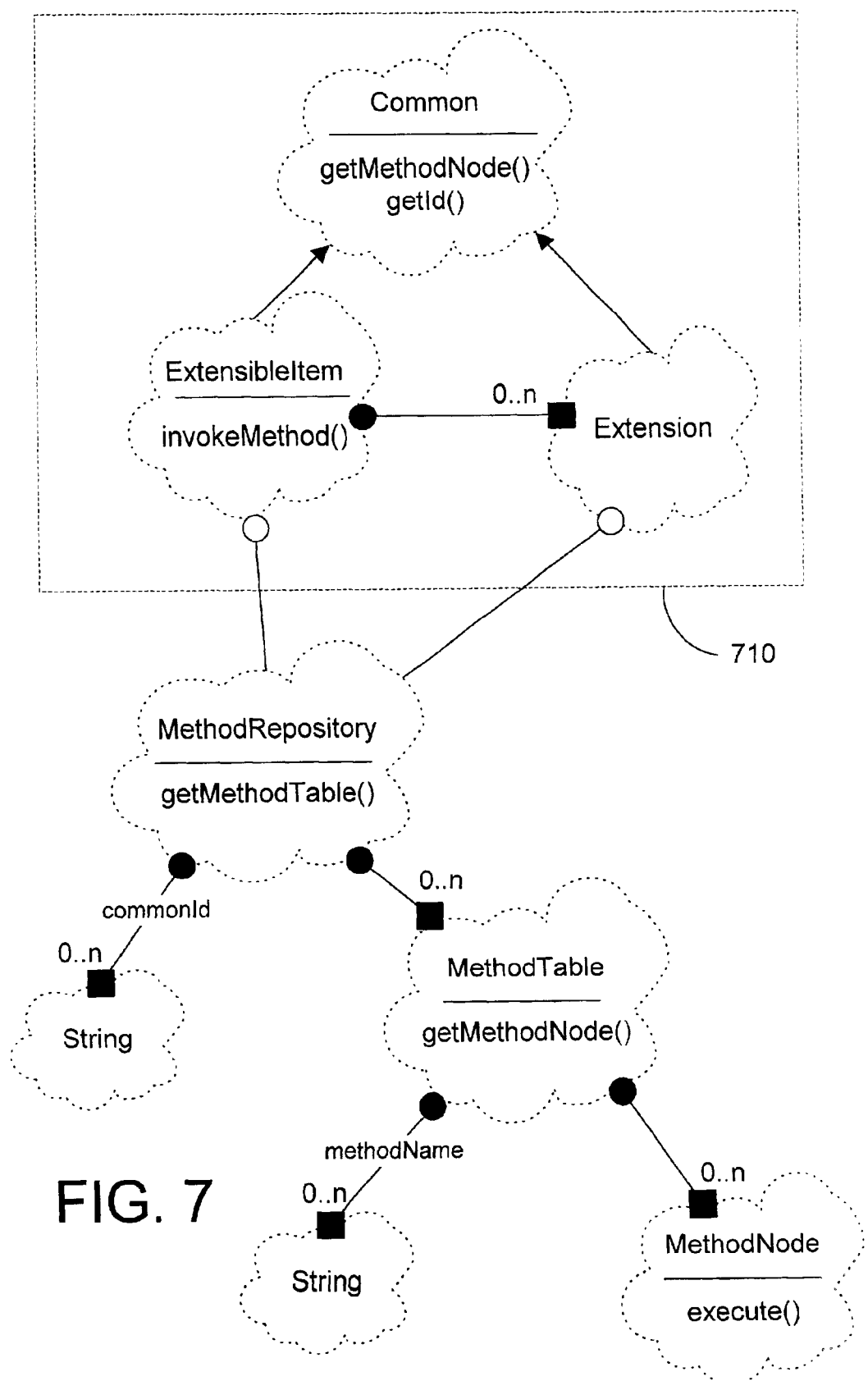
FIG. 7 is a class diagram showing an implementation for an extensible item in accordance with a preferred embodiments.

Referring now to FIG. 7, a class diagram shows the classes for an implementation of an extensible item in accordance with a preferred embodiment. The differences between the implementation of this illustrated embodiment is easily compared to the implementation in the existing San Francisco by comparing the class diagram of FIG. 7 to the prior art class diagram in FIG. 1. The ExtensibleItem class and Extension class still have their same relationship, with the ExtensibleItem owning zero to N extensions. Each of these classes are subclasses of a Common class. However, in the preferred embodiment, the Common class defines two methods getMethodNode( ) and getId( ) that were not present in the prior art implementation of Common. An important difference between the prior art in FIG. 1 and the implementation according to the preferred embodiment illustrate in FIG. 7 is that the ExtensibleItem class does not own a method table as shown in FIG. 1. Instead, the ExtensibleItem and the Extension classes have a "uses" relationship with a MethodRepository class. The MethodRepository class defines a method getMethodTable( ). When invoking getMethodTable, a commonId that corresponds to the extension is specified as a parameter, and a method table corresponding to the commonId is returned. Thus, MethodRepository includes key-value pairs of commonIds and MethodTable objects. Each MethodTable object is similar to the MethodTable object in FIG. 1, containing key-value pairs of methodNames and corresponding MethodNodes, and defining a getMethodNode( ) method that is invoked to find out which MethodNode corresponds to a specified methodName. The significance of having the ExtensibleItem and Extension classes "use" the MethodRepository instead of "containing" a MethodTable is that the memory requirements for the ExtensibleItem are greatly reduced. The memory footprint for the ExtensibleItem implementation of FIG. 7 is shown by the dotted box 710, compared to the entire figure in FIG. 1 for the prior art approach. All methods and relationships on the MethodRepository class are static, so instances of the classes outside of box 710 are transient objects rather than persistent objects. This reduction in memory footprint for an ExtensibleItem is significant, resulting in a reduction of the size of extensible objects by eight times when compared to the prior art implementation in version 1.2 of the San Francisco framework. Note, however, that the invokeMethod( ) method on the ExtensibleItem class provides the same client interface as the ExtensibleItem in FIG. 1. Thus, the external interface remains the same while the internal implementation is improved to provide better memory usage and enhanced run-time performance.

Figure 8:
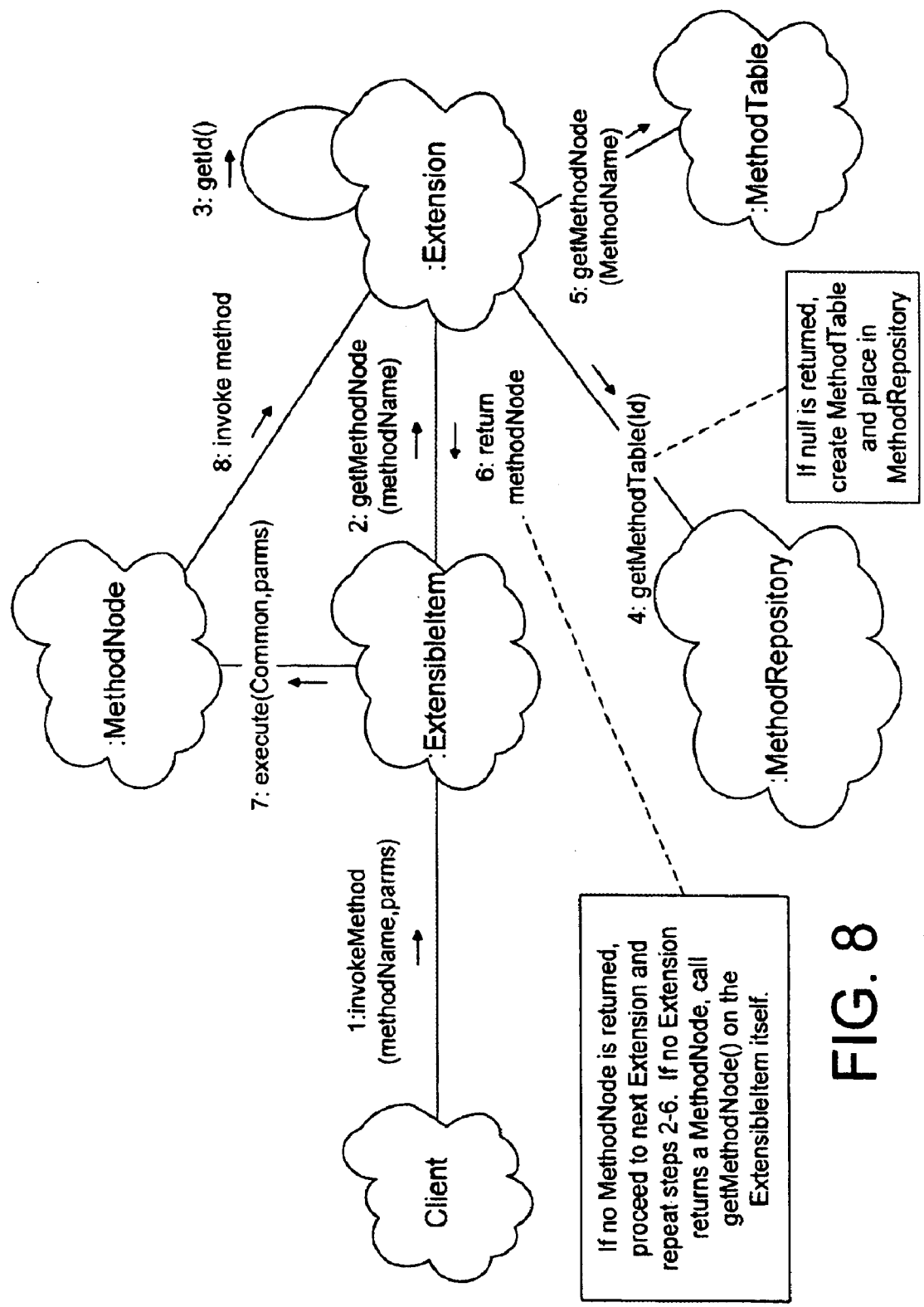
FIG. 8 is an object interaction diagram showing steps to invoke a method on the extensible item of FIG. 7 in accordance with the preferred embodiments when the invokeMethod( ) method on the ExtensibleItem is invoked by a client.

The invocation of a method on an ExtensibleItem by a client for the implementation shown in FIG. 7 is shown in the object interaction diagram of FIG. 8. First, a client calls invokeMethod( ) on the ExtensibleItem, passing the methodName and parameters that related to the method call (step 1). Next, the ExtensibleItem invokes the getMethodNode( ) method on the newest Extension, passing the methodName as a parameter (step 2). The Extension then retrieves an identifier (ID) corresponding to the Extension (step 3). Next, the Extension object invokes the getMethodTable( ) method on the MethodRepository object (step 4), passing the ID that was retrieved in step 3. The MethodRespository responds by returning a MethodTable object that corresponds to the Extension. Now the Extension knows which MethodTable to use, it calls getMethodNode( ) (step 5) on the MethodTable returned in step 4, specifying the MethodName that was passed in step 2. The MethodTable object returns the MethodNode object that corresponds to the passed MethodName. The Extension now returns the methodNode returned in step 5 to the ExtensibleItem (step 6). ExtensibleItem then invokes the execute( ) method (step 7) on the MethodNode object that was identified in step 6, specifying the Common class and the parameters for the method call, which causes the appropriate method to be invoked on the appropriate instance of the Common class (step 8), which is the Extension object for the example shown in FIG. 8.

Note that if null is returned in response to the Extension object invoking the getMethodTable( ) method on the MethodRepository in step 4, this means that the Method-Table for the Extension has not yet been created. The Extension will then cause its corresponding MethodTable to be created, and will place that MethodTable in the MethodRepository along with a unique ID that correlates the MethodTable and the Extension. At this point the MethodTable that was just created and the ID are returned to the Extension object, which proceeds with step 5 as described above. In this manner the MethodTable that corresponds to an Extension is not created until it is needed, and it is created on first touch.

If no MethodNode is returned in step 6, this means that the Extension does not support the methodName. The next Extension for the ExtensibleItem is then selected, and steps 2-6 are repeated. This process continues until all Extensions are considered. If no Extension returns a MethodNode corresponding to the specified methodName, the getMethodNode( ) method is invoked on the ExtensibleItem itself. In the preferred embodiments, implementations of methods in later extensions will effectively override the earlier implementations, as discussed with reference to FIGS. 4 and 5 for the prior art implementation. Thus, for an ExtensibleItem as shown in FIG. 5, the ExtensibleItem in FIG. 8 will first invoke steps 2-6 on Extension5, then on Extension4, and so on until either a MethodNode is returned, or all extensions have been processed. If no extensions return a MethodNode, the getMethodNode( ) is then called on the ExtensibleItem itself.

Figure 9:
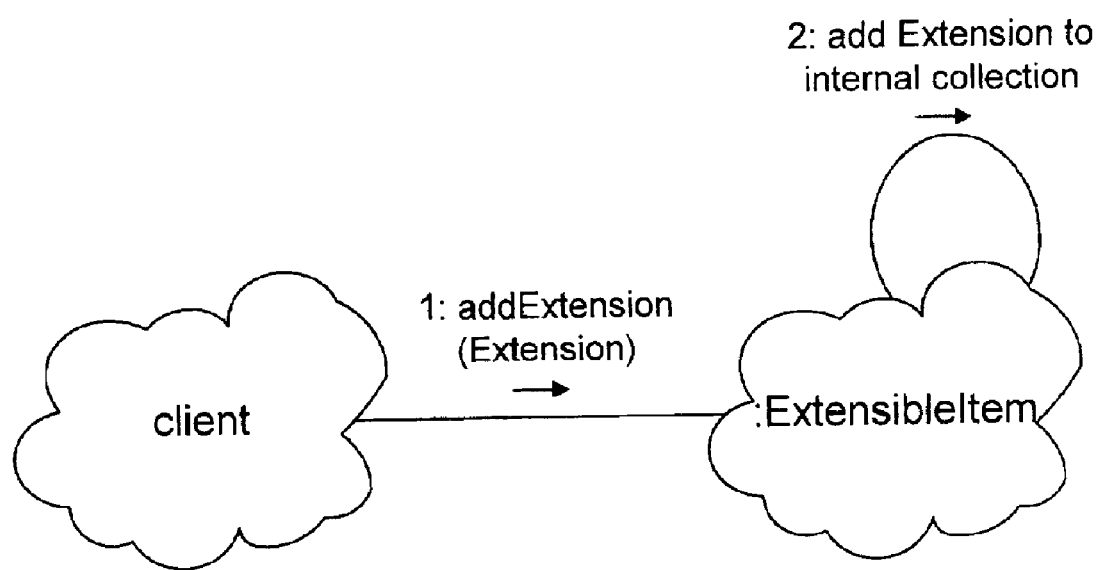
FIG. 9 is an object interaction diagram showing the steps for adding an extension to an extensible item in accordance with the preferred embodiments.

The addition of extensions to an extensible item in accordance with the preferred embodiments is much simpler than the addition of extensions in the prior art, shown in FIG. 3. Referring now to FIG. 9, when a client needs to add an extension to an ExtensibleItem object, it invokes the addExtension( ) method on the ExtensibleItem, specifying the Extension object to add (step 1). In response, the ExtensibleItem object adds the Extension to its internal collection (step 2). No other action is required at the time the Extension is added to the ExtensibleItem. The MethodTable corresponding to the Extension will be created the first time it needs to be accessed.

One difference between the prior art implementation of an extensible item and an implementation of an extensible item in accordance with the preferred embodiments relates to the MethodTable. In the prior art, there is a method table for each instance of the ExtensibleItem that is consulted for all extensions, as shown in FIGS. 4 and 5. When a new extension is added, the MethodTable is updated to reflect the new addition. With the preferred embodiments, in contrast, there is a MethodTable that is defined for each extension class and a MethodTable that is defined for the ExtensibleItem class. Thus, instead of having one method table per ExtensibleItem instance that must be updated to reflect every new addition or deletion of an extension, all extensions of the same class share a common method table. The implementation of the preferred embodiments thus provides much less overhead in adding and deleting extensions, which can be easily seen when comparing the steps in adding an extension in accordance with the preferred embodiments in FIG. 9 with the steps in adding an extension in the prior art system in FIG. 3. This savings in overhead results in programs that run significantly faster, up to five times faster when compared to the prior art approach using San Francisco version 1.2.

Note that in referring to FIG. 8, it is clear that the run-time performance of a system in accordance with the present invention can be impacted if the number of extensions becomes large. In the prior art, a single method table is maintained for the extensible item to effectively cache information from all extensions. Thus, when a method is invoked, the applicable method node can be easily identified. In the invention, in contrast, a separate method table is created and maintained for each extension class and for the extensible item class. As shown in FIG. 8, if a large number of extensions exist, and if many of the newer extensions do not support the methodName, steps 2-6 in FIG. 8 will have to be repeated for each extension in reverse chronological order of creation until the extension that supports the method is found. Lab testing has shown that this run-time penalty is generally only noticed when a large number of extensions exist. For most programs that use run-time extensible items, the present invention still greatly enhances the performance of the program.

The present invention provides an implementation for a run-time extensible item that greatly improves system performance by simplifying the steps that must be taken when an extension is added or deleted. In addition, this implementation greatly reduces the memory requirements (i.e., footprint) for the extensible items. Instead of maintaining one method table for each extensible item instance, a separate method table is created at run-time at first touch for each extension class that is common and shared among all instances of that class. In this manner the overhead of adding an extension is greatly reduced. From the client perspective, nothing about the extensible item has changed when compared to the prior art implementation. The same methods are provided, which preserves the backwards compatibility with existing software. However, changing the internal implementation of the extensible item makes programs that use extensible items run much faster and use much less memory than in the prior art approach.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:
   (1) at least one processor;
   (2) a memory coupled to the at least one processor;
   (3) an object oriented run-time extensible item class residing in the memory, the extensible item class including:
   at least one extension class;
   at least one object oriented method that may be invoked by a client;
   (4) a separate method table object residing in the memory for each extension class that is shared among instances of the extension class, each method table object correlating at least one method name to a corresponding method node object;
   (5) a method repository object residing in the memory, the method repository object including the method table object for each extension class.

2. The apparatus of claim 1 wherein each extension class defines persistent objects, and the method repository object is a transient object.

3. The apparatus of claim 1 wherein each method table object is a transient object that is created the first time the method table object is needed.

4. The apparatus of claim 1 wherein the method repository object comprises a key-value pair for each extension class, the key comprising a unique identifier for each extension class, the value comprising a method table that contains methods for the extension class corresponding to the unique identifier in the key-value pair.

5. An apparatus comprising:
(1) at least one processor;
(2) a memory coupled to the at least one processor;
(3) an object oriented run-time extensible item class residing in the memory, the extensible item class including:
at least one extension class;
at least one object oriented method that may be invoked by a client;
(4) a separate method table object residing in the memory for each extensible item class that is shared among instances of the extensible item class, each method table object correlating at least one method name to a corresponding method node object;
(5) a method repository object residing in the memory, the method repository object including the method table object for each extensible item class.

6. The apparatus of claim 5 wherein the extensible item class defines persistent objects, and the method repository object is a transient object.

7. The apparatus of claim 5 wherein each method table object is a transient object that is created the first time the method table object is needed.

8. The apparatus of claim 5 wherein the method repository object comprises a key-value pair for the extensible item class, the key comprising a unique identifier for the extensible item class, the value comprising a method table that contains methods for the extensible item class corresponding to the unique identifier in the key-value pair.

9. A computer-implemented method for responding to the invocation of an object oriented method on a run-time extensible item class, the run-time extensible item class including at least one extension class, the method comprising the steps of:
instantiating at run-time a method repository that includes a method table for each extension class, the method repository comprising a key-value pair for each extension class, the key comprising a unique identifier for each extension class, the value comprising a method table that contains methods for the extension class corresponding to the unique identifier in the key-value pair;
identifying which method table in the method repository has a method node corresponding to the invoked method; and
the method node invoking an object oriented method on an instance of the at least one the extension class.

10. A computer-implemented method for responding to the invocation of an object oriented method on a run-time extensible item class, the run-time extensible item class including at least one extension class, the method comprising the steps of:

instantiating at run-time a method repository that includes a method table for the extensible item class, the method repository comprising a key-value pair for the extensible item class, the key comprising a unique identifier for the extensible item class and for each extension class, the value comprising a method table that contains methods for the class corresponding to the unique identifier in the key-value pair;
identifying which method table in the method repository has a method node corresponding to the invoked method; and
the method node invoking an object oriented method on an instance of the extensible item class.

11. A program product comprising:
(A) an object oriented run-time extensible item class that defines:
an object oriented extension class;
at least one object oriented method that may be invoked by a client;
(B) a method table class that defines a method table for each instance of the extension class, each method table correlating at least one method name to a corresponding method node;
(C) a method repository class that correlates an instance of the method table class with each instance of the extension class; and
(D) tangible signal bearing media storing the extensible item class, the method table class, and the method repository class.

12. The program product of claim 11 wherein the signal bearing media comprises recordable media.

13. The program product of claim 11 wherein the signal bearing media comprises transmission media.

14. The program product of claim 11 wherein the extension class defines persistent objects, and the method repository class defines transient objects.

15. The program product of claim 11 wherein the method table is a transient object that is created the first time the method table is needed.

16. The program product of claim 11 wherein the method repository class defines a key-value pair for the extensible item class and for the extension class, the key comprising a unique identifier for the extensible item class and for each extension class, the value comprising a method table that contains methods for the extension class corresponding to the unique identifier in the key-value pair.

17. A program product comprising:
(A) an object oriented run-time extensible item class that defines:
an object oriented extension class;
at least one object oriented method that may be invoked by a client;
(B) a method table class that defines a method table for each instance of the extensible item class, each method table correlating at least one method name to a corresponding method node;
(C) a method repository class that correlates an instance of the method table class with each instance of the extensible item class; and
(D) tangible signal bearing media storing the extensible item class, the method table class, and the method repository class.

18. The program product of claim 17 wherein the signal bearing media comprises recordable media.

19. The program product of claim 17 wherein the signal bearing media comprises transmission media.

20. The program product of claim 17 wherein the extensible item class defines persistent objects, and the method repository class defines transient objects.

21. The program product of claim 17 wherein the method table is a transient object that is created the first time the method table is needed.

22. The program product of claim 17 wherein the method repository class defines a key-value pair for the extensible item class, the key comprising a unique identifier for the extensible item class, the value comprising a method table that contains methods for the extensible item class corresponding to the unique identifier in the key-value pair.

* * * * *